April 3, 1962 H. C. CLARK 3,028,082
CALCULATOR
Filed March 29, 1960 2 Sheets-Sheet 1
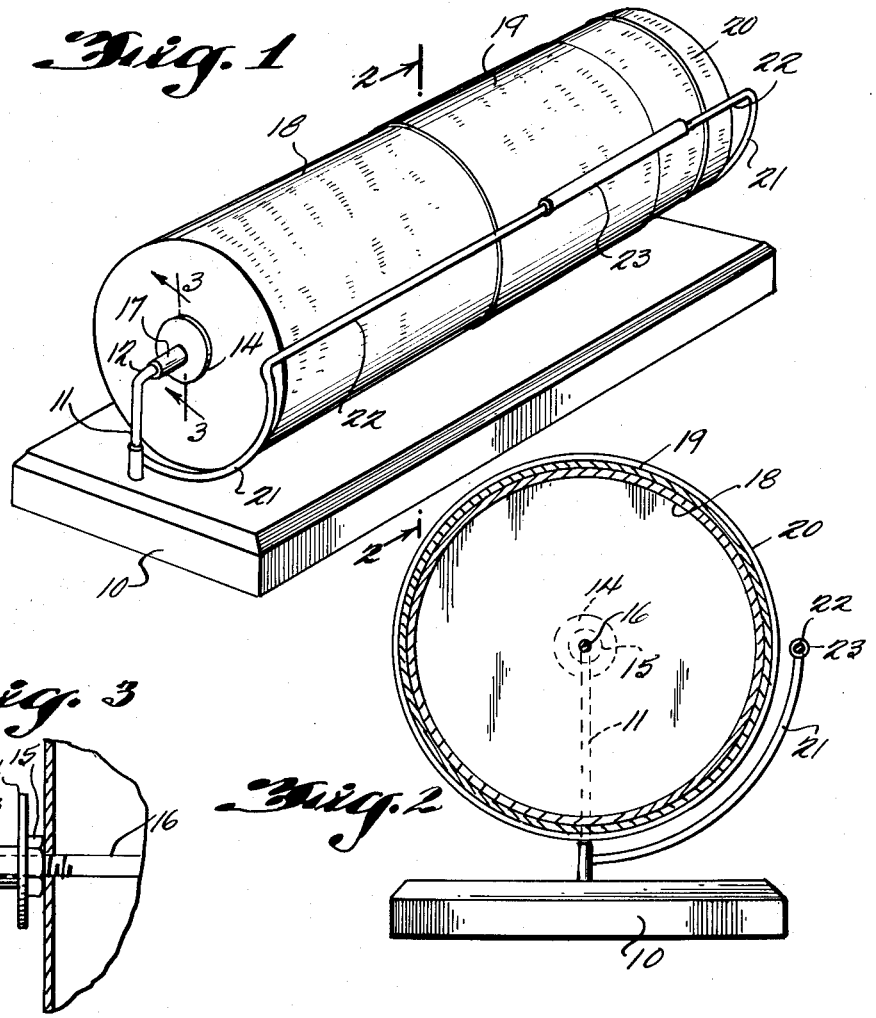
INVENTOR.
HOWARD C. CLARK
BY
Kimmel & Crowell
ATTORNEYS April 3, 1962

H. C. CLARK 3,028,082

CALCULATOR

Filed March 29, 1960

INVENTOR.
HOWARD C. CLARK
BY
Kimmel & Crowell
ATTORNEYS

United States Patent Office 3,028,082
Patented Apr. 3, 1962

3,028,082
CALCULATOR
Howard C. Clark, Palmer, Ill.
(R.R. 2, Centralia, Mo.)
Filed Mar. 29, 1960, Ser. No. 18,314
4 Claims. (Cl. 235—87)

This invention relates to a calculator, and has as its primary object the provision of an improved device whereby the elapsed time between two dates may be readily determined, in days and months.

An additional object of the invention is the provision of a numerical calculator whereby the elapsed time between two days of the same month or different dates of different months or even different years may be readily determined with a minimum of effort and difficulty.

An additional object of the invention is the provision of such a device wherein the operation may be achieved mechanically without the necessity of mathematical computation to any large extent.

A further object of the invention resides in the arrangement of numerical indicia on a calculating device of this character.

Still another object of the invention resides in the provision of a mechanical device having related operating elements for achieving the foregoing objects.

Still other objects reside in the combinations of elements, arrangements of parts, and features of construction, all as will be more fully pointed out hereinafter, and disclosed in the accompanying drawing wherein there is shown a preferred embodiment of this inventive concept.

In the drawing:

FIGURE 1 is a perspective view of one form of calculator embodying features of the instant invention.

FIGURE 2 is an enlarged sectional view taken substantially along the line 2—2 of FIG. 1 as viewed in the direction indicated by the arrows.

FIGURE 3 is an enlarged sectional view taken substantially along the line 3—3 of FIG. 1 as viewed in the direction indicated by the arrows.

FIGURE 4 is a plan view of the cylinder of the instant invention, partially broken away, with certain of the numerical indicia thereon being indicated in an illustrative manner.

FIGURE 5 is a similar plan view of a collar slidable and rotatable on the cylinder of FIG. 4.

FIGURE 6 is a similar plan view of a collar adapted to be rotatably mounted on the cylinder of FIG. 4.

FIGURE 7 is a fragmentary plan view showing the alignment of certain of the elements of the invention as employed in an illustrative example, and FIGURE 8 is a view similar to FIG. 7 showing the numerical alignment of the figures and parts in the second illustrative example.

Having reference now to the drawings in detail the mechanical device of the instant invention comprises a base 10, of any desired configuration, from the ends of which a pair of vertical supports 11 extend upwardly, and terminate in horizontal portions 12 which carry collars 13, provided with flanges 14, and internal collars 15. The collars 15 are provided with central bores, which accommodate the ends of an axle 16, which extend through the end plates 17 of a drum or cylinder 18. The drum or cylinder 18 is provided with columns of numerical indicia, in a manner to be more fully described hereinafter.

Mounted on the drum or cylinder 18 is a sleeve 19, which is freely rotatable thereon and linearly slidable throughout substantially the full length of the cylinder 18. A collar 20 is mounted on one end of cylinder 18, and is so arranged as to be linearly stationary relative to the cylinder, but rotatable thereabout, all for a purpose to be more fully described hereinafter.

A pair of arcuate members 21 extend upwardly from the base of each upright 11, and are connected by means of a transversely extending rod or bar 22, which is positioned substantially at the midpoint of cylinder 18 on one side thereof. A transverse rod 22 is provided with a slide member 23, which is linearly movable therealong, and which when stopped in a manner to be described hereinafter serves to indicate the answer to a numerical problem postulated to the calculator.

Referring back now to the cylinder 18, it will be seen that this cylinder contains 13 columns of figures arranged to be read both horizontally and vertically in conjunction with the rod 22 and its associated slide 23. The first column on the left begins with the numeral 1, and contains every seventh numeral up to and ending with the number 365. This column reads from top to bottom. The following 12 columns are of the same general nature, that is, every seventh number only and are numbered from top to bottom. Column 2 starts with the number 2 and ends with 359. Column 3 starts with number 3 and ends with 360. Column 4 starts with number 4 and ends with 361. Column 5 starts with number 5 and ends with 362. Column 6 starts with number 6 and ends with 363. Column 7 starts with the number 7 and ends with 364. This column has above the number 7 a zero starting dot as best seen in FIG. 4.

Column 8 starts with the number 1 and ends with 365, but this column starts one number above the preceding columns even and in line with the zero starting dot. Column 9 starts with number 2 and ends with 359. Column 10 starts with number 3 and ends with 360. Column 11 starts with number 4 and ends with 361. Column 12 starts with number 5 and ends with 362. Column 13 starts with number 6 and ends with 363. Columns 9 to 13 inclusive start evenly in alignment with column 8 and the zero starting dot above column 7.

On the far right-hand side of the cylinder 18 is a further chart containing the names of the months of the year in consecutive order from January to December, and then repeating the months a second time from January to December making a total of 24 months in all.

There is a further column of numbers to the right of the numbers of months, it being pointed out that the months are aligned with alternate rows of the numbers of the first 13 columns. This last column comprises the numbers 1 to 31, aligned with each adjacent line of the numbers of the first 13 columns.

The tube or sleeve 19 which is free to rotate about as well as slide along the cylinder 18 contains 365 numbers in rows of seven numbers each with the last or bottom row containing one number. This makes a total of 52 rows with seven numbers and one row with one number. Each of these rows represent the weeks of the year. The actual number in each row represents the day of the month, while the month of the year is shown to the left of the chart, as seen in FIG. 5. As illustrative, the month of January is shown to the left of the first 31 numbers, after 31 which represents the 31 days in January the numbers start with 1 and go to 28. To the left of this second group of numbers (1 to 28) is shown the month of February. Thus, January and February have been represented by the first 8 weeks or 8 rows and 3 days, that is the first three numbers in the ninth row of the year. The month of March is also illustrated as is the month of May, together with some of the numbers indicating the days of the month. An example, using the present invention, illustrating the manner of determining the passage of time between a certain day in March and a certain day in May will be later given. The other months and days of the year are shown in the same manner.

The tube or collar 20 which is free to rotate about the cylinder 18 is positioned to the right of the last two columns of figures described on the cylinder, and contains a column of figures reading from top to bottom running consecutively from 1 to 31, and then repeating, running again from 1 to 31, making a total of 62 numbers.

In the use and operation of the device to find the elapsed days between two dates, the operation is as follows. For example, assume that it is desired to determine the number of days between April 14 and June 20 of the same year. This is accomplished by rotating the cylinder 18 until the zero starting dot, that is the dot at the top of column 7 of the 13 columns to the left of the device is directly above the slide 23 on transverse rod 22. Then, move the slide 23 until its left-hand end is directly below the zero starting dot. Holding the cylinder 18 stationary rotate the sleeve 19 until a line containing the starting date April 14th is directly over the right end of slide 23. Sleeve 19 is then moved along cylinder 18 until April 14th is directly over the right end of slide 23.

The next step consists of rotating the cylinder 18 and the sleeve 19 together until a line on sleeve 19 which contains the ending date (June 20th) is over the slide 23, whereupon the slide 23 is moved until the right end thereof is directly under June 20th. At this point the number directly above the left end of slide 23 is the number of days elapsed between the two dates, that is, 67.

The alignment of the numbers under these conditions is disclosed in FIG. 7.

If leap year and February 29th is involved the operator will mentally add 1 to the number of elapsed days.

If the two dates used are in separate years, as example December 1st to January 3rd, then the number blocked in on the cylinder is employed as the zero starting dot, and the original starting dot is disregarded. On the illustrative model this number is 358 in the eighth column from the left on cylinder 18. This number could change on different models depending on the size and spacing of the printing on the charts, and must be determined individually.

In order to find out how many months and days have elapsed between two dates, the starting date and the ending date are required. For example, in determining the number of days between March 10th and May 15th the sleeve 19 is rotated until the top dot at the end of a column of figures running from 1 to 24 and starting at the fifth transverse line and being located adjacent each alternate line on the sleeve is to the left of the month of March in the column of months on the cylinder 18. The sleeve 20 is then rotated until the number 10 is to the right of the starting indicia at the top of the extreme right-hand column of figures on cylinder 18. These steps enter the starting date. Of the parts in this position the number to the left of the month of May in the column of figures adjacent the months on sleeve 18 will be the number of months between the two dates. In this example, the number is 2 which stands for two months.

The next step is to find the number of days in addition to two months. Since May 15th is the ending date, the number 15 is located on collar 20, and the number adjacent to this in the extreme right-hand column on cylinder 18 will then be the number 5, which is the last step in the operation and the answer is two months and five days. This operation will vary only when the figure in the starting date is larger than the figure in the ending date, for example, March 15th to June 10th. Under these conditions the only change in the operation as previously described is that the other or second indicia member at the top of the last-described column of figures is employed. Thus, from March 15th to June 10th by employing the same method previously described may be determined that 2 months and 26 days have elapsed.

While in the foregoing two illustrative examples have been described, it will be understood that any desired dates may be employed, and by similarly using the apparatus the elapsed time and number of days, or in days and months may be readily determined.

From the foregoing it will now be seen that there is herein provided an improved calculator, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In an elapsed time calculator for determining the number of days between given dates, the combination of a base, a pair of uprights thereon, a cylinder having correlated aligned columns and rows of indicia thereon rotatably mounted between said uprights, a sleeve having aligned columns and rows of indicia thereon correlated with said first-mentioned indicia slidably and rotatably mounted on said cylinder, a guide rod mounted on said base extending horizontally across the full length of said cylinder for alignment with the rows of indicia thereon, and an elongated computing slide mounted on said guide rod.

2. In an elapsed time calculator for determining the number of days between given dates, the combination of a base, a pair of uprights thereon, a cylinder having correlated aligned columns and rows of indicia thereon rotatably mounted between said uprights, a sleeve having aligned columns and rows of indicia thereon correlated with said first-mentioned indicia slidably and rotatably mounted on said cylinder, a guide rod mounted on said base extending horizontally across the full length of said cylinder for alignment with the rows of indicia thereon, and an elongated computing slide mounted on said guide rod, the length of said slide being correlated to the number of rows of indicia on said sleeve.

3. In an elapsed time calculator for determining the number of days between given dates, the combination of a base, a pair of uprights thereon, a cylinder having correlated aligned columns and rows of indicia thereon rotatably mounted between said uprights, a sleeve having aligned columns and rows of indicia thereon correlated with said first-mentioned indicia slidably and rotatably mounted on said cylinder, a guide rod mounted on said base extending horizontally across the full length of said cylinder for alignment with the rows of indicia thereon, an elongated computing slide mounted on said guide rod, the length of said slide being correlated to the number of rows of indicia on said sleeve, and a collar carrying an additional column of indicia mounted on said cylinder for rotation thereabout independently of the rotation of said sleeve.

4. The structure of claim 3 wherein the indicia on said collar is correlated with the indicia on said cylinder.

References Cited in the file of this patent

UNITED STATES PATENTS

| | | |
|---|---|---|
| 860,662 | Herbert | July 23, 1907 |
| 2,553,653 | Graham | May 22, 1951 |